(12) United States Patent
Skelding

(10) Patent No.: US 9,180,736 B2
(45) Date of Patent: Nov. 10, 2015

(54) WHEEL AXLE FOR A CONSTANT-VELOCITY DRIVE TYPE DRIVESHAFT JOINT WITH ADJUSTABLE AXIAL POSITIONS

(71) Applicant: ARRMA DURANGO LTD, Ashby-de-la-Zouch (GB)

(72) Inventor: Adam Skelding, Chesterfield (GB)

(73) Assignee: ARRMA DURANGO LTD, Ashby-De-La-Zouch (GB)

( * ) Notice: Subject to any disclaimer, the term of this patent is extended or adjusted under 35 U.S.C. 154(b) by 15 days.

(21) Appl. No.: 14/209,881

(22) Filed: Mar. 13, 2014

(65) Prior Publication Data

US 2015/0258852 A1    Sep. 17, 2015

(51) Int. Cl.
  *F16D 3/202* (2006.01)
  *B60B 35/14* (2006.01)
  *F16D 3/30* (2006.01)
  *F16D 3/10* (2006.01)

(52) U.S. Cl.
  CPC . *B60B 35/14* (2013.01); *F16D 3/10* (2013.01); *F16D 3/30* (2013.01)

(58) Field of Classification Search
  CPC ..... F16D 3/50; F16D 3/2052; Y10S 180/906; B60B 35/14
  USPC ................. 464/112, 113, 120–122, 123, 155; 403/131, 135, 379.5; 180/906, 908; 81/177.2, 177.75
  See application file for complete search history.

(56) References Cited

U.S. PATENT DOCUMENTS

| | | | | |
|---|---|---|---|---|
| 148,382 A | * | 3/1874 | Pitcher | 464/120 |
| 1,188,883 A | * | 6/1916 | Betts | 464/122 |
| 3,727,430 A | | 4/1973 | Eddy | |
| 4,065,941 A | * | 1/1978 | Aoki | 81/177.75 X |
| 4,359,123 A | * | 11/1982 | Haupt et al. | 180/906 |
| 4,643,698 A | | 2/1987 | Ehrlenspiel et al. | |
| 4,792,168 A | * | 12/1988 | Kardosh | |
| 5,954,586 A | | 9/1999 | Kirson | |
| 6,165,075 A | | 12/2000 | Kita et al. | |

(Continued)

OTHER PUBLICATIONS

"ECX Electrix RC Smash Drive Shaft & Axle Dog Bone Set", <http://www.ebay.com/itm/ECX-Electrix-RC-Smash-Drive-Shaft-Axle-Dog-Bone-Set-/321289353884pt=Radio_Control_Parts_Accessories&hash= item4ace567a9c#ht_331wt_1157>, downloaded Jan. 15, 2014.

(Continued)

*Primary Examiner* — Gregory Binda
(74) *Attorney, Agent, or Firm* — Drinker Biddle & Reath LLP

(57) ABSTRACT

Disclosed herein is a multi-axle component for a constant-velocity drive type driveshaft joint system, comprising: a rotation shaft comprising an end distal to a joint region, and an end proximate to the joint region; a generally cylindrical ball receiving housing located at the proximate end, comprising a cylindrical wall adapted to receive at least a partially spherically shaped shaft end; at least two holes provided in the cylindrical wall that are axially displaced from one another along a rotation axis of the multi-axle component; and a pin that extends through only one of the axially displaced holes at a time to join the shaft end with the multi-axle component. Furthermore, a wheel axle system for a constant-velocity drive type driveshaft joint, is provided that uses the multi-axle component

7 Claims, 7 Drawing Sheets

(56) References Cited

U.S. PATENT DOCUMENTS

| | | | |
|---|---|---|---|
| 6,176,334 B1* | 1/2001 | Lorenzen | 180/906 |
| 6,840,864 B2 | 1/2005 | Dupuie et al. | |
| 7,431,652 B2 | 10/2008 | Furusawa | |
| 8,342,970 B2 | 1/2013 | Altimas et al. | |
| 2006/0128478 A1 | 6/2006 | Carden | |

OTHER PUBLICATIONS

"Kyosho Inferno MP9 TKI3 RS Front Universal CVD Center Rear Axle Drive Shaft Cups", <http://www.ebay.com/itm/ws/eBayISAPI.dll?ViewItem&item=380800160960&item=380800160960&Igeo=1&vectorid=229466>, downloaded Jan. 15, 2014.

"90012—FLM Extended Length CVD Kit Kit for HPI Baja 5B, 5T", <http://www.largescalerc.coni/90012-flmextendedlengthcvdkitkitforhpibaja5b5t.aspx>, downloaded Jan. 15, 2014.

"MIP CVD Center Drive T-Maxx Version 1", <http://www3.omnimodels.com/cgi-bin/woi0001p?&I=MIPC1486&P=FN>, downloaded Jan. 15, 2014.

"Arrowmax MRX-5 front universal joint set", <http://www.redrc.net/2011/07/arrowmax-mrx-5-front-universal-joint-set/>, downloaded Jan. 15, 2014.

"ARRMA Drive Shaft Set", <http://comparerc.com/#!/product/15000/arrma-drive-shaft-set/>, downloaded Jan. 15, 2014.

"CVD Front Drive Shaft Set—Hudy Spring Steel™ (1)", <http://www.teamxray.com/teamxray/products/proddesc.php?prod_id=2046&kategoria=2271&catName=CVD%20Front%20Drive%20Shaft%20Set%20-%20Hudy%20Spring%20Steel%99%20%281%29&Xnet_Session=bde67cd40bbc97913e73b85887fdf803>, downloaded Jan. 15, 2014.

"Team Losi Racing 8IGHT 3.0 Front & Rear CV Driveshaft Axles Alum (4) TLR3500", <http://www.ebay.com/itm/ws/eBayISAPI.dll?ViewItem&item=331104085671&item=331104085671&Igeo=1&vectorid=229466>, downloaded Jan. 15, 2014.

"MCD Rear Axle for CVD-shaft", <http://www.robitronic.com/en/news-reader/mcd-rear-axle-for-cvd-shaft.html>, downloaded Jan. 15, 2014.

"Traxxas Slash 4×4, 1/10 Rally Front CVD Race Duty Drive Shaft Kit by MIP 13105", <http://www.ebay.com/itm/ws/eBayISAPI.dll?ViewItem&item=201006915672&item=201006915672&Igeo=1&vectorid=229466>, downloaded Jan. 15, 2014.

"Hot Racing Optional Front CVD Kit for the Axial EXO", <http://www.hobbyetc.com.php5-10.dfw1-2.websitetestlink.com/item.cgi?part_id=76338;browser=OD3tXi5Hd81ICKV65Bw8A>, downloaded Jan. 15, 2014.

"CLX Series CVD Wheel Axle, Front/Rear (2)", <http://www.nitrotek.co.uk/clx-series-cvd-wheel-axle-front-rear-2.html>, downloaded Jan. 15, 2014.

* cited by examiner

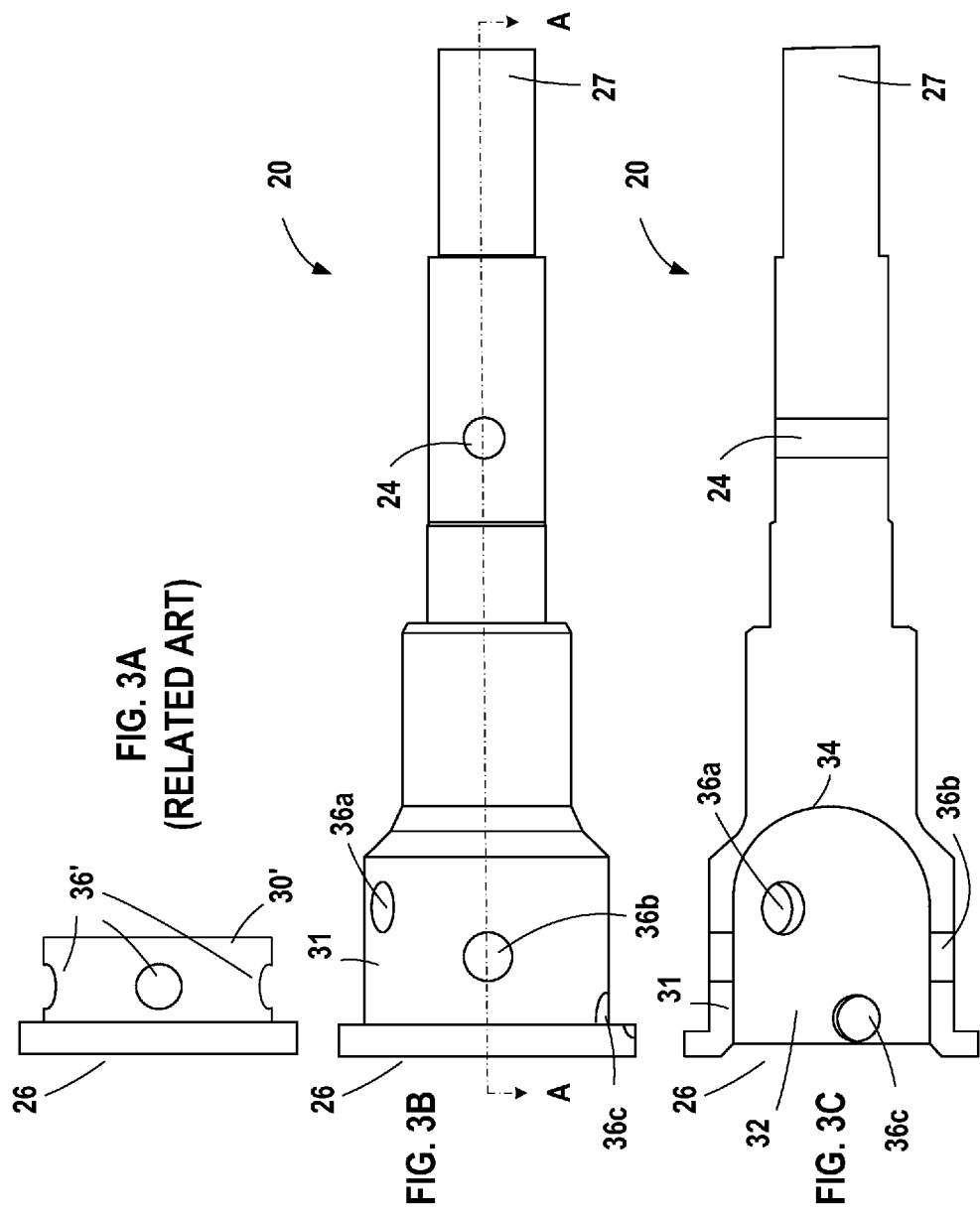

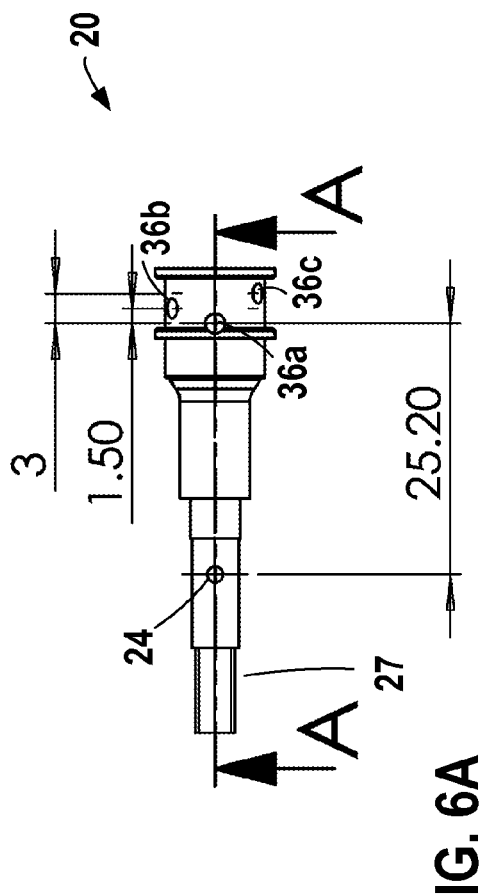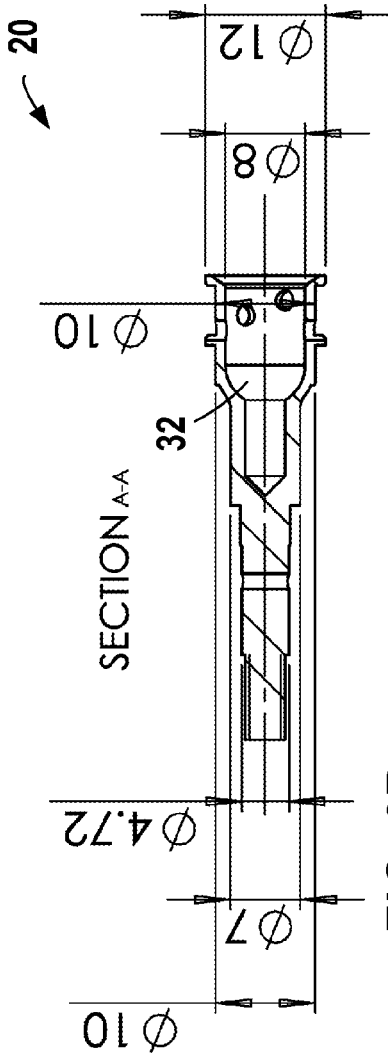
FIG. 6A
FIG. 6B

WHEEL AXLE FOR A CONSTANT-VELOCITY DRIVE TYPE DRIVESHAFT JOINT WITH ADJUSTABLE AXIAL POSITIONS

BACKGROUND

Disclosed herein is a wheel axle for constant-velocity drive (CVD) type driveshaft joint and an associated system utilizing such a joint. Constant-velocity joints, also called homokinetic joints, allow a drive shaft to transmit power through a variable angle, at constant rotational speed. This is done while keeping friction and play at a minimum.

In known such devices, the location of the joint itself remains at a fixed axial distance from a shaft to which a wheel hex used to mount the shaft, and thus, the characteristics of the CVD joint system cannot be readily varied.

SUMMARY

Therefore, various embodiments of the invention are described herein that provide a more flexible CVD joint system. Disclosed herein is a multi-axle component for a constant-velocity drive type driveshaft joint system, comprising: a rotation shaft comprising an end distal to a joint region, and an end proximate to the joint region; a generally cylindrical ball receiving housing located at the proximate end, comprising a cylindrical wall adapted to receive at least a partially spherically shaped shaft end; at least two holes provided in the cylindrical wall that are axially displaced from one another along a rotation axis of the multi-axle component; and a pin that extends through only one of the axially displaced holes at a time to join the shaft end with the multi-axle component.

Furthermore, a wheel axle system for a constant-velocity drive type driveshaft joint, is provided that uses the multi-axle component described above, wherein the rotation shaft is a first rotation shaft; and the system further comprises a dog-bone component comprising a second rotation shaft comprising an end distal to a joint region, and an end proximate to the joint region; wherein: the spherically shaped shaft end comprises an engagement portion that engages the pin and pivotally links the first rotation shaft with the second rotation shaft.

As used herein, unless otherwise indicated, the following terms related to the shaft will be defined as: "proximate" to mean proximate with respect to the joint portion or joint ends of the respective shafts, and "distal" to mean distal with respect to the joint portion or joint ends of the respective shafts. Also, the term "axially displaced" means displaced in a direction along the shaft axis, and is distinguished from "radially displaced", which means displaced rotationally about the shaft axis.

BRIEF DESCRIPTION OF THE DRAWINGS

Various embodiments of the invention are illustrated in the drawings, as described below:

FIG. 3A is a side view of an attachment portion of the related art;

FIG. 3B is a side view of the multi-axle;

FIG. 3C is a cross-section view along A-A in FIG. 3B;

FIG. 6A is a side view of the multi-axle portion with exemplary measurements, according to an embodiment; and FIG. 6B is a cross section of the multi-axle portion illustrated in FIG. 6A.

DETAILED DESCRIPTION

Figure 1:
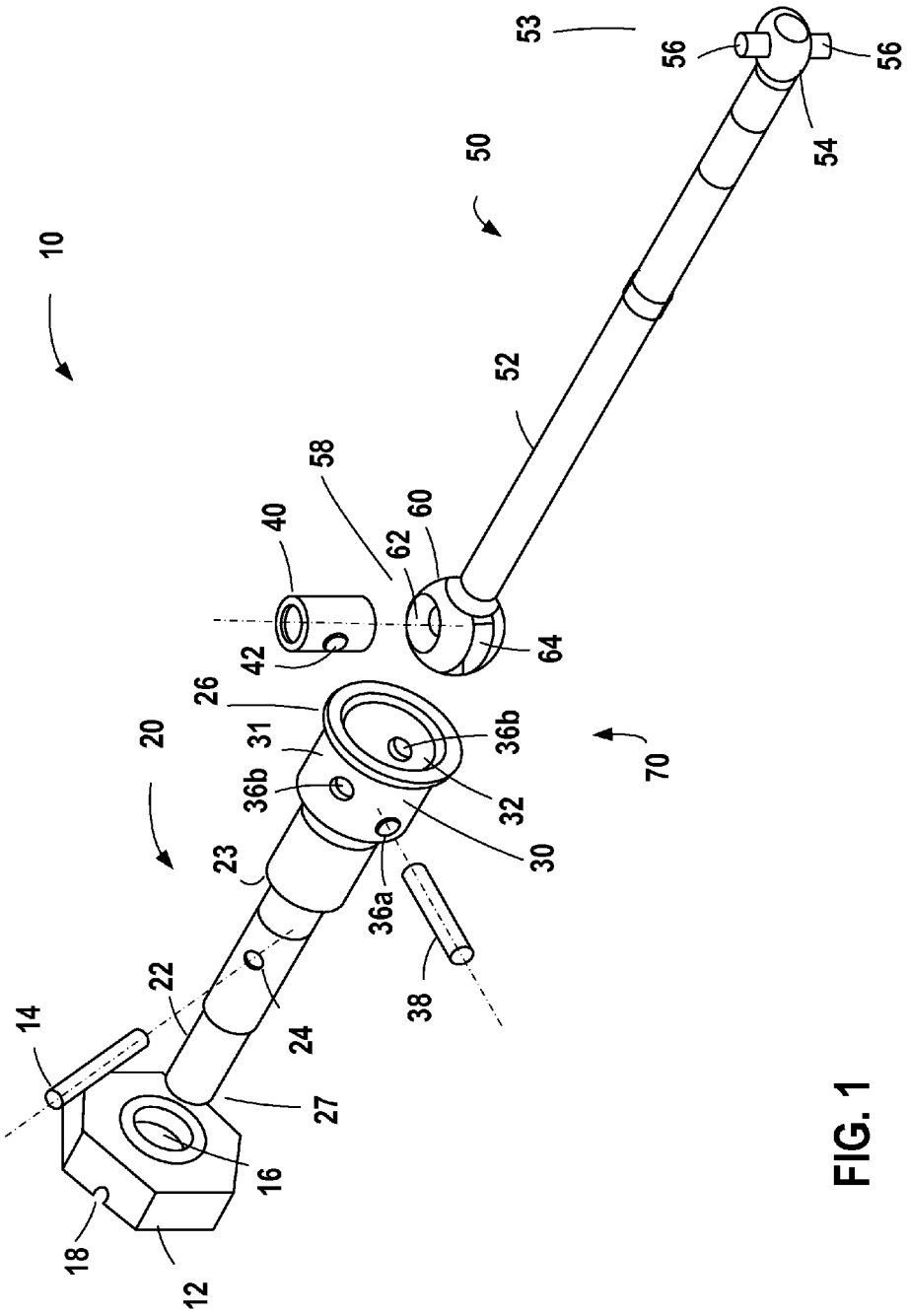
FIG. 1 is an exploded perspective view of a multi-axle CVD joint.
Figure 1A:
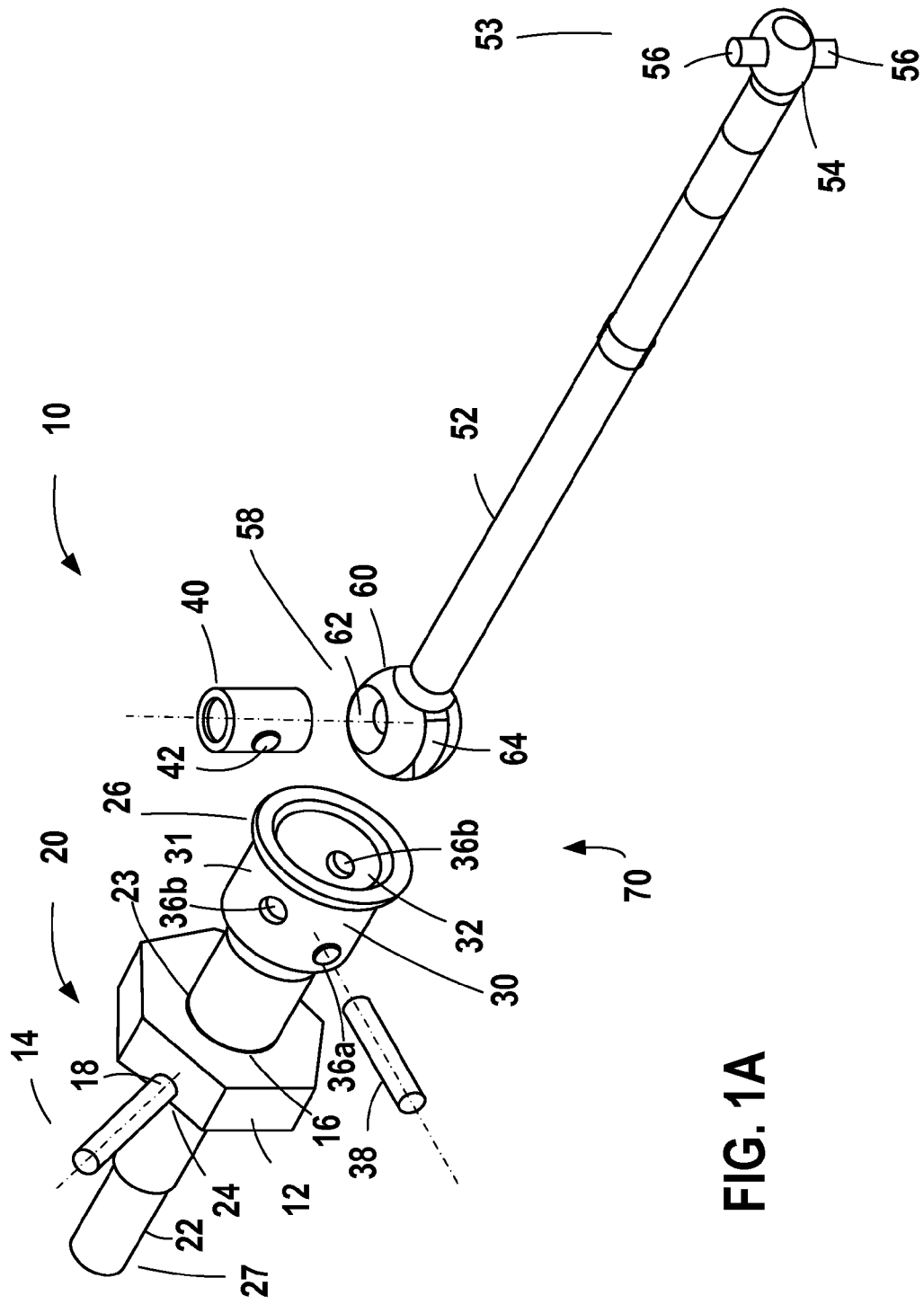
FIG. 1A is the exploded perspective view of a multi-axle CVD joint with the wheel hex mounted and pin inserted.

Referring to FIG. 1, an embodiment of the multi-axle CVD joint system 10 is illustrated, which has, as primary elements, a multi-axle component 20 comprising a first rotation shaft 22, and a dog-bone portion 50 comprising a second rotation shaft 52.

The first rotation shaft 22 interfaces with other components connected to a vehicle or other machine via, e.g., a wheel hex 12. In the embodiment illustrated, the wheel hex 12 has a hole 16 that axially slides onto the first rotation shaft 22, past a shaft hole 24. A wheel hex pin 14 may be inserted through this hole, with a protruding portion of the pin 14 engaging a notch 18 on the wheel hex 12 to prevent the wheel hex 12 from sliding off of the shaft. At an opposite side from the notch 18, a wheel hex face 19 may abut a stop portion 23 on the shaft that is larger than the hole. Thus, the wheel hex 12 is held in place via the pin 14 engaging the notch 18, and the face 19 abutting the stop portion 23.

At a joint (proximate) end 26 of the first rotation shaft 22, that is opposite a distal end 27, is a cylindrical ball receiving housing 30. This receiving housing 30 comprises a ball receiving hole 32, with a plurality of receiving housing holes 36a, 36b placed in a cylindrical wall 31 of the receiving housing. The holes have a differing axial placement, meaning, e.g., that a first hole 36a may be closer to the distal end of the first rotation shaft 22, and a second hole 36b may be closer to the proximate end of the first rotation shaft 22. The significance of this placement will be discussed in more detail below. The holes may be paired, e.g., as illustrated in FIG. 1, with two holes 36b, 36b having a same axial placement along the first rotational shaft 22, but on opposite sides of the housing cylinder 30. Also, although two holes 36a, 36b having different axial placement are illustrated in FIG. 1, the number of holes is not so limited, and can be any number of holes having differing axial placement. The housing 30 may further comprise a lip 33.

The second rotation shaft 52 comprises a distal end 53 which may include a distal ball portion 54 having projections 56 for engaging with other components connected to the vehicle or other machine.

At the proximal or joint end 58 of the second rotation shaft 52 is a ball portion 60 that fits within the ball receiving hole 32 of the first rotations shaft 22. The ball portion comprises a ball hole 62, and a ball slit 64 that is provided on the spherical surface of the ball portion 60 and is aligned axially with the second rotation shaft 52. The ball hole 62 has an axis that is generally perpendicular to the ball slit 64. The slit 64 may be provided on opposite sides of the spherical surface of the ball portion 60.

As can be seen in FIG. 1, a cylindrical barrel 40 is sized to fit within the ball hole 62, and comprises a barrel pin hole 42 that is designed to face the slit 64 when the barrel 40 is inserted into the hole 62. When assembled, the ball portion 60 of the second rotation shaft 52, with the barrel 40 inserted therein, is inserted into the ball receiving hole 32 of the first rotation shaft 22. The receiving housing pin 38 may be inserted into one of the holes or hole pairs 36a, 36b of the receiving housing 30, through the slit 64, and through the barrel pin hole 42—this construction forms the CVD joint 70. With this configuration, the second rotation shaft 52 can be driven at the same rotational frequency as the first rotation shaft 22 at a wide range of pivot angles about the axis of the cylindrical barrel 40.

Advantageously, utilizing different axially placed holes 36a, 36b, i.e., providing multiple axial positions of the CVD joint 70, results in different performance characteristics. Depending on which set of holes 36a, 36b is being used, the position of the CVD joint 70 in relation to the wheel hex 12 is adjusted. This adjustment changes the feel of e.g., the car when throttle is applied and will, in a context of use for a model car, allow the user to set a model car up for various conditions and surfaces.

The adjustable length of the total length of the CVD using just one axle allows the driver to tune how the car reacts on and off power and during cornering. Shortening the overall length of the CVD gives the car more on power traction on corner exit and the car has a tendency to "straighten up" quicker. This change also makes the car "pivot" quicker on corner entry. Conversely, lengthening the overall length of the CVD gives the car more stability in the corners allowing the car to carve a smoother line, but it will not have as much rotation on corner entry and will not "straighten up" as fast on corner exit.

Figure 2:
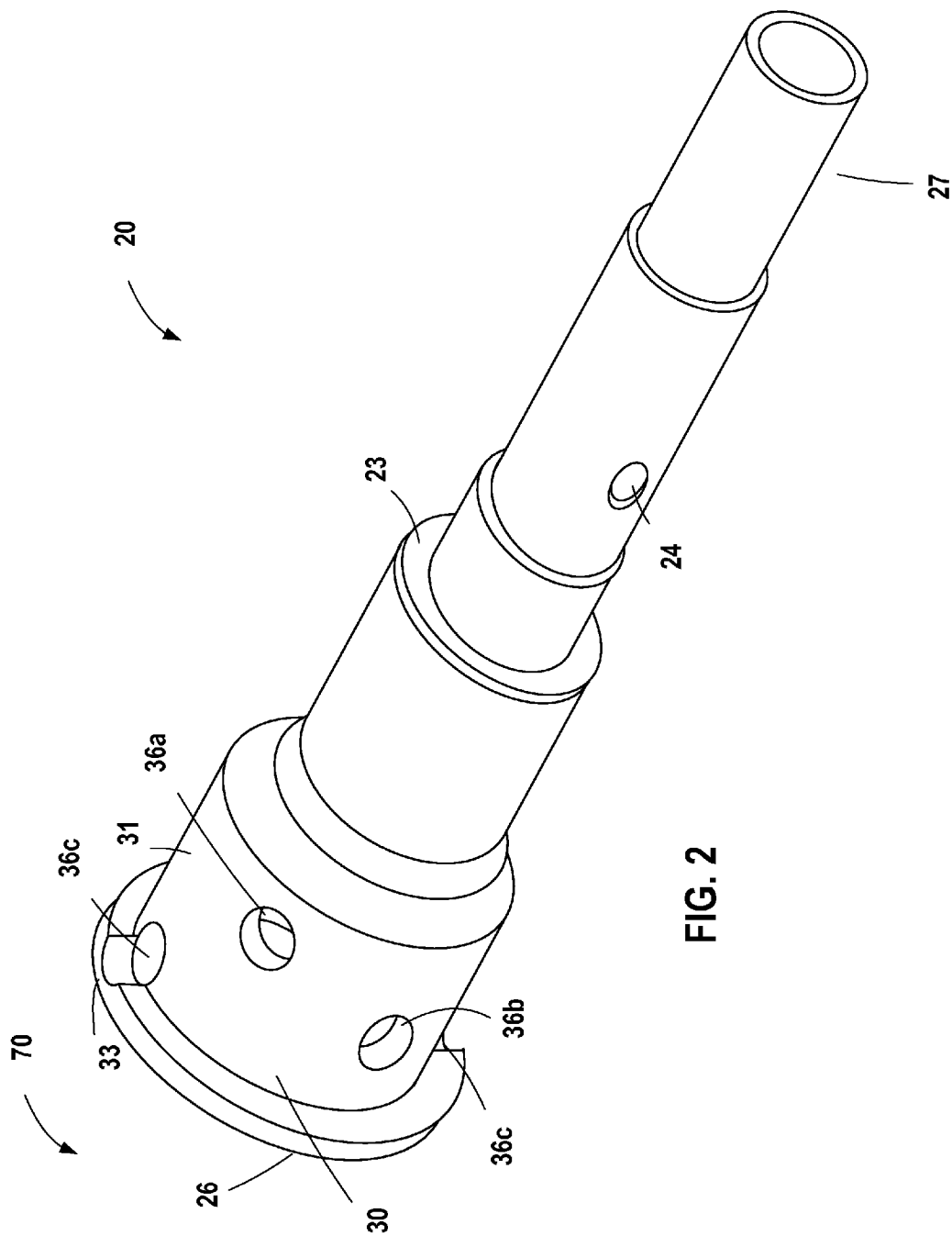
FIG. 2 is a perspective view of the multi-axle.

FIG. 2 provides an embodiment of the multi-axle 20 with three set of holes: a first 36a that is closest to the distal end 27, and thus closest to the wheel hex 12 when assembled, a second 36b that is further from the distal end 27 than the first set 36a, and finally, a third 36c that are furthest from the distal end 27, and thus furthest from the wheel hex 12 when assembled. As can be seen in FIG. 2, the third set of holes 36c are so close to the proximate end 26 that they may cut into the lip 33 of the housing 30 in order to maximize the distance between the wheel hex 12 and the joint 70.

FIG. 3A illustrates a related art design in which a plurality of holes 36' are provided in the receiving housing 30'. However, all though the plurality of holes 36' are radially spaced from one another, they are not axially displaced, as are the holes 36a, 36b, and 36c, as described herein. FIG. 3B is a side view of the multi-axle that clearly illustrates the difference in the axial displacement of the respective holes 36a, 36b, 36c, versus the non-axially displaced holes 36' of the related art shown in FIG. 3A. The cylindrical wall 31 region is longer axially than in the related art design of FIG. 3A. FIG. 3C shows a sectional view along line A-A, in which the receiving hole region 32 can be seen, including the back wall 34.

Figure 4A:
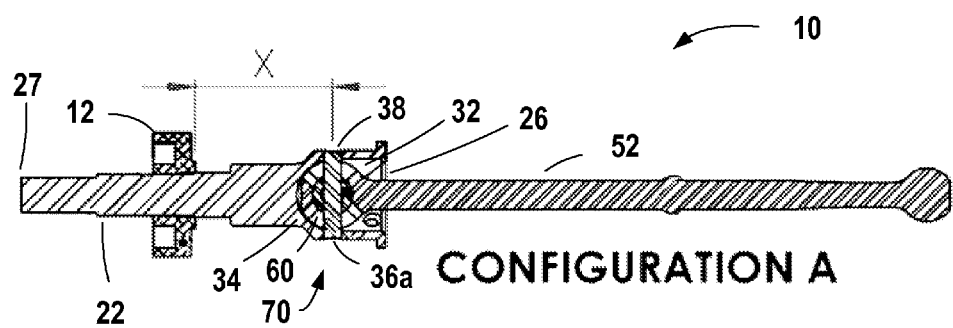
FIGS. 4A-C are side views of the multi-axle CVD joint in three different configurations.
Figure 4B:
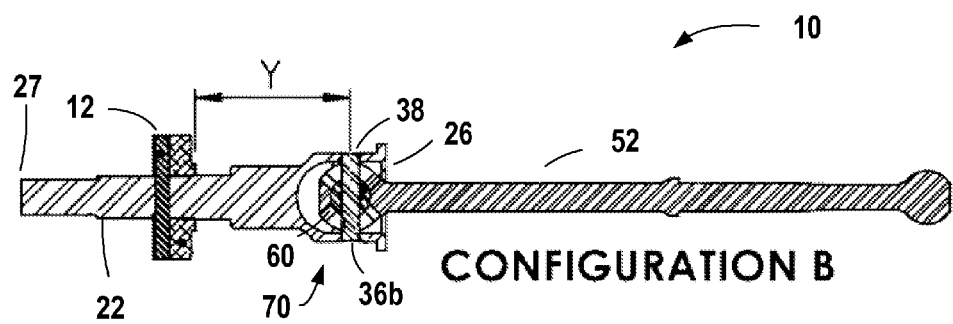
Figure 4C:
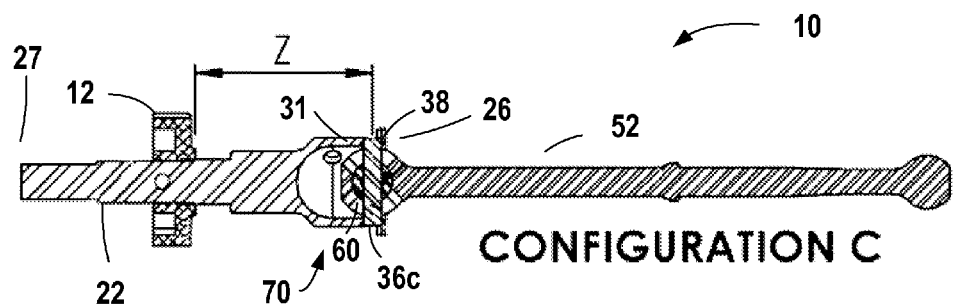
Figure 5A:
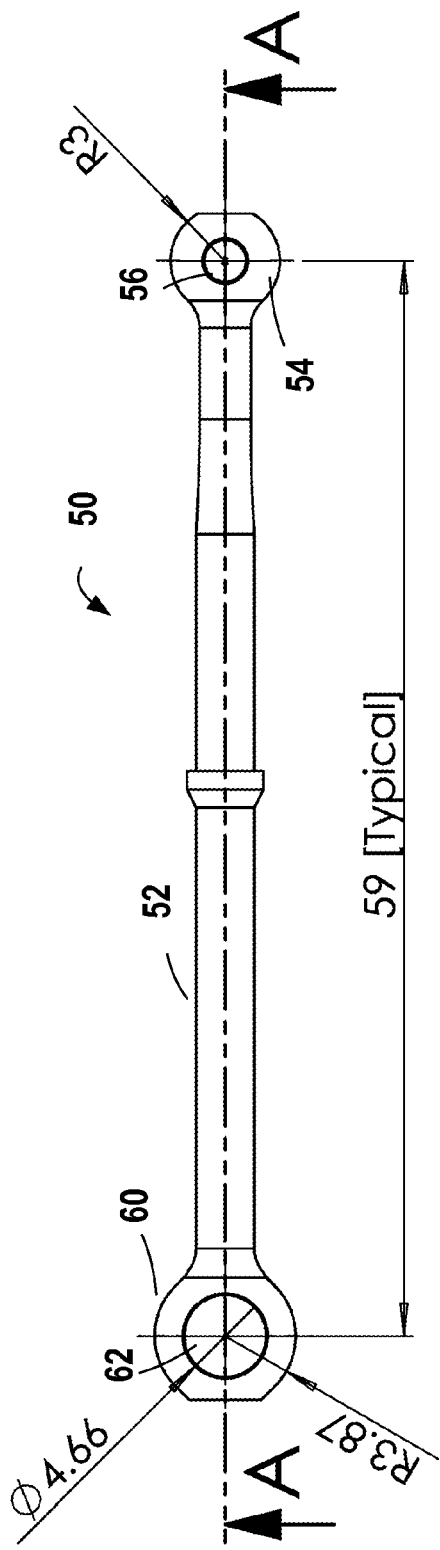
FIG. 5A is a side view of the dog-bone portion with exemplary measurements, according to an embodiment.
Figure 5B:
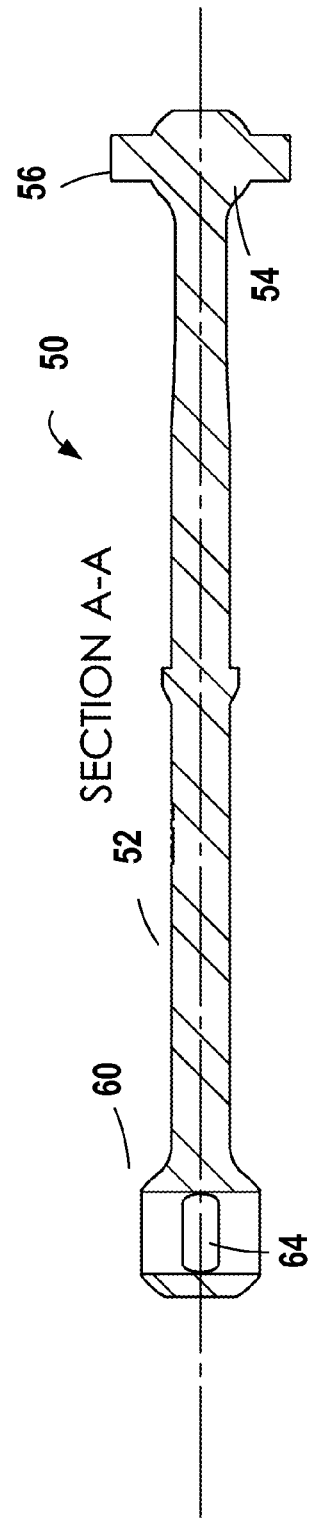
FIG. 5B is a cross section of the dog-bone portion illustrated in FIG. 5A.

FIGS. 4A-C illustrate the differences in the multi-axle CVD joint system when the different holes are used. In FIG. 4A, the pin 38 is placed into the first holes 36a, which creates a minimum distance X between the joint 70 and the wheel hex 12. In this configuration, the ball 60 is at its closest position to the wheel hex 12, since the end portion of the ball 60 nearly abuts the back wall of the ball receiving hole.

In FIG. 4B, the pin 38 is placed into the second holes 36b, which creates a medium distance Y between the joint 70 and the wheel hex 12.

Finally, in FIG. 4C, the pin 38 is placed into the third holes 36c, which creates a maximum distance Z between the joint 70 and the wheel hex 12. The holes are placed as close to the end 26 as possible while still providing the structural integrity to hold the pin 38 (and, as noted before, can possibly extend to the lip portion 33). The closest distance to the end 26 would depend on the strengths of the materials involved (metal, being stronger than plastic, would allow a placement closer to the end 26) as well as the anticipated forces involved (e.g., weight of the vehicle). One of ordinary skill in the art using a strength of materials analysis could determine the closest distance permitted to the end 26 while maintaining the necessary structural integrity.

The possible angle between the first rotation shaft 22 and the second rotation shaft 52 is greatest in the FIG. 4C configuration (in which the pin 38 is as close as possible to the proximate end 26), and is least in the FIG. 4A configuration (in which the edge of the ball portion 60 is as close as possible to a back wall region of the ball receiving hole 34). As can be seen in FIGS. 4A-C, the back wall/end 34 of the receiving hole has a hemispherical shape that is preferably just slightly larger than the ball portion 60. This shape allows a full accommodation of rotation of the ball portion 60. However, this could be shortened or flattened in the event that an end portion of the ball portion 60 is flattened as well, to accommodate the more limited angle of motion when the joint is configured as shown in FIG. 4A.

FIGS. 5A-6B provide exemplary measurements for the multi-axle 20 and the dog-bone 50. The measurements shown are in millimeters, which are appropriate for a model vehicle—however, the invention should not be limited to a model vehicle, and the measurements could be easily scaled to a full-size vehicle or any other form of machine using a CVD type driveshaft joint. Of significance is the exemplary distance variance possible between the shaft hole 24 of the multi-axle and the projections 56 of the dog-bone 50. In its shortest configuration, this overall distance in the exemplary illustration is 25.2+59=84.2. In its longest configuration, this overall distance is 25.2+59+3=87.2 (a 3.6% increase). These dimensions could easily be varied to achieve different min./max. ratios. However, as cylindrical axis length of the ball receiving hole 32 becomes longer with respect to its diameter (and presuming the holes 36a and 36c are at the outer extremes of their positions), the relative angle of motion for the dog-bone portion 50 possible becomes smaller when mounted in the holes 36a.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The embodiments may be described in terms of functional block components and various processing steps. Such functional blocks may be realized by any number of components that perform the specified functions.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. Expressions such as "at least one of," when preceding a list of elements, modify the entire list of elements and do not modify the individual elements of the list.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are used herein generally and are not limited solely to mechanical embodiments. Numerous modifications and adaptations will be readily apparent to those skilled in this art without departing from the spirit and scope of the invention.

TABLE OF REFERENCE NUMERALS 10 multi-axle CVD joint system
12 wheel hex
14 wheel hex pin
16 wheel hex hole
20 multi-axle
22 first rotation shaft
24 shaft hole
26 first rotation shaft (joint) proximate end
27 first rotation shaft joint distal end
30 cylindrical ball receiving housing
30' cylindrical ball receiving housing (related art)
31 cylindrical wall of housing
32 ball receiving hole
33 housing lip
34 back wall of the ball receiving hole
36' related art housing hole
36a receiving housing first hole
36b receiving housing second hole
36c receiving housing third hole
38 CVD receiving housing pin
40 CVD cylindrical barrel
42 barrel pin hole
50 dog-bone
52 second rotation shaft
53 second rotation shaft distal end
54 distal ball portion
56 projections
58 second rotation shaft proximate (joint) end
60 proximate ball portion/at least partially sphere shaped portion
62 ball barrel hole
64 ball slit
70 CVD joint

What is claimed is:

1. A multi-axle component for a constant-velocity drive type driveshaft joint system, comprising:
    a rotation shaft comprising an end distal to a joint region, and an end proximate to the joint region;
    a generally cylindrical ball receiving housing located at the proximate end, comprising;
    a cylindrical wall adapted to receive at least a partially spherically shaped shaft end; and
    a rear wall adjacent to the rotation shaft that closes an end of the ball receiving housing;
    at least two holes provided in the cylindrical wall that are axially displaced from one another along a rotation axis of the multi-axle component; and
    a pin that extends through only one of the axially displaced holes at a time to join the shaft end with the multi-axle component;
wherein:
    each of the at least two holes has a counterpart hole on an opposite side of the cylindrical wall, each hole and counterpart hole forming a respective hole pair; and
    the pin is extendable through both hole pairs at different times, but only both holes of one hole pair at a time, leaving the other hole pair empty.

2. The component of claim 1, further comprising:
    a hole in the rotation shaft; and
    a pin that holds a wheel hex at an axial position along the rotation shaft.

3. The component of claim 1, wherein a first hole of the at least two holes is located nearest the proximate end while providing adequate support and structural integrity for the pin.

4. A wheel axle system for a constant-velocity drive type driveshaft joint, comprising:
    a multi-axle component for a constant-velocity drive type driveshaft joint system, comprising:
        a rotation shaft comprising an end distal to a joint region, and an end proximate to the joint region;
        a generally cylindrical ball receiving housing located at the proximate end, comprising a cylindrical wall adapted to receive at least a partially spherically shaped shaft end;
        at least two holes provided in the cylindrical wall that are axially displaced from one another along a rotation axis of the multi-axle component; and
        a pin that extends through only one of the axially displaced holes at a time to join the shaft end with the multi-axle component;
    wherein the rotation shaft is a first rotation shaft;
    the wheel axle system further comprising:
        a component comprising a second rotation shaft comprising an end distal to a joint region, and an end proximate to the joint region;
    wherein:
        the spherically shaped shaft end comprises an engagement portion that engages the pin and pivotally links the first rotation shaft with the second rotation shaft.

5. The system of claim 4, wherein a second hole of the at least two holes is located furthest from the proximate end while the spherically shaped shaft end immediately abuts a back portion of the housing.

6. The system of claim 4, wherein the engaging portion comprises a slit through which the pin protrudes.

7. The system of claim 6, wherein the engaging portion further comprises:
   a cylindrical element having a hole in its cylindrical wall; and
   a hole of the spherically shaped shaft end into which the cylindrical element is located;
wherein:
   the pin protrudes through the hole in the cylindrical element.

\* \* \* \* \*